United States Patent [19]

Klausz

[11] 4,367,409

[45] Jan. 4, 1983

[54] IONIZATION GAS DETECTOR AND TOMO-SCANNER USING SUCH A DETECTOR

[75] Inventor: Remy Klausz, Paris, France

[73] Assignee: Thomson-CSF, Paris, France

[21] Appl. No.: 206,829

[22] Filed: Nov. 14, 1980

[30] Foreign Application Priority Data

Nov. 14, 1979 [FR] France ................................ 79 28041

[51] Int. Cl.[3] ................................................ G01T 1/18

[52] U.S. Cl. .................................................... 250/385

[58] Field of Search ........................ 250/374, 379, 385; 313/93, 100

[56] References Cited

U.S. PATENT DOCUMENTS

| | | | |
|---|---|---|---|
| 3,385,988 | 5/1968 | Hyun | 250/390 |
| 4,075,527 | 2/1978 | Cummings | 313/93 |
| 4,158,774 | 6/1979 | Stokes | 313/93 |
| 4,253,024 | 2/1981 | Peschmann | 250/385 |

*Primary Examiner*—Alfred E. Smith
*Assistant Examiner*—Janice A. Howell
*Attorney, Agent, or Firm*—Oblon, Fisher, Spivak, McClelland & Maier

[57] ABSTRACT

Ionization chamber detector making it possible to eliminate stray signals generally due to deformations of lines of force of the electrical field created between the electrodes of the ionization chamber, the deformations being located at the ends of the electrodes. The detector comprises an ionization chamber sealingly subdivided into at least two compartments by means of a dielectric material partition which is permeable to the ionizing radiation beam, the compartments being successively arranged on the path of the beam. The downstream compartment contains the measuring electrodes and the upstream compartments the guard electrodes, which are respectively coplanar and are raised to the same potentials as the measuring electrodes. The gases introduced into both compartments at the same high pressure have different atomic numbers.

11 Claims, 6 Drawing Figures

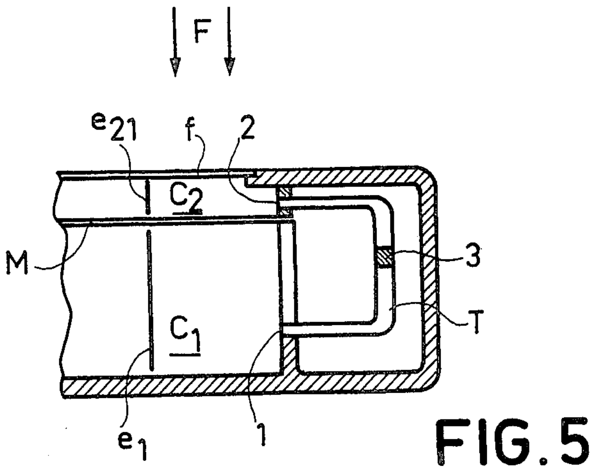
FIG. 5
FIG. 6
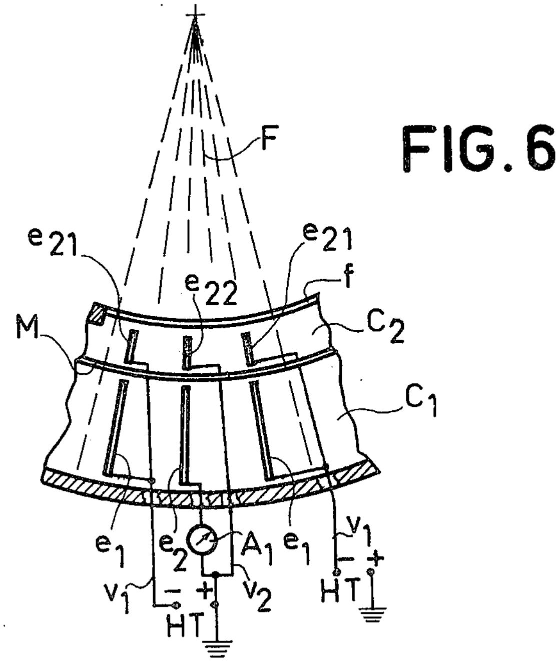

IONIZATION GAS DETECTOR AND TOMO-SCANNER USING SUCH A DETECTOR

FIELD OF THE INVENTION

The present invention relates to an ionization gas detector, for example of the multicellular type, which can be advantageously used in a tomoscanner.

BACKGROUND OF THE INVENTION

Detectors of this type use ionization chambers like those described for example in French Pat. No. 2,292,985. These ionization chambers are constituted by a tight enclosure provided with a window permeable to the beam of ionizing radiation (X or Y rays). The enclosure contains metal plates or electrodes which are substantially parallel to one another and perpendicular to the window. These electrodes are raised to potentials of given values, so as to establish a high electrical field (several thousand Volts/cm) and which is also as uniform as possible between two successive electrodes. A gas with a high atomic number is introduced at high pressure into the tight enclosure in such a way that the beam of ionizing radiation entering the enclosure ionizes the gas which it contains, thus freeing the ions and electrons which are respectively collected by the electrodes.

However, in ionization chambers, electrical field lines generally have deformations at the end of the electrodes. These deformations are due to the projection of the electrical field at the ends of the electrodes and to the presence of the intake window located in the vicinity thereof, as described in French Pat. No. 2,348,567.

Therefore, part of the electrical charges is not collected by the electrodes, which reduces the efficiency of the detector and can also lead to stray currents. The electrical fields in fact undergo deformations such that the ions and/or electrons produced in the space between the collecting electrodes and the window cannot be collected by these electrodes and consequently do not contribute to the electrical signals supplied at the detector output.

In order to obviate these disadvantages it has been proposed (French Pat. No. 2,348,567) to place a layer of dielectric material on the inner surface of the window. The disadvantage of this solution is to eliminate the autocollimation effect of the detector, which is particularly necessary for eliminating diffused radiation.

It is therefore necessary for the detector to be equipped with a device which serves both as a collimator and a guard electrode, whilst in no way prejudicing the efficiency of the detector. One solution is to arrange a guard electrode in the extension of each of the measuring electrodes in the ionization chamber, the guard electrode being at the same potential as the electrode which it extends, thereby eliminating the deformations of the electrical field. However, if the guard electrodes are located in the same enclosure, they would collect charged particles (ions or electrons) which reduces the efficiency of the detector. However, if these guard electrodes are positioned outside the ionization chamber, the distance separating the guard electrode and the corresponding measuring electrode will be considerable, due to the thickness of the window, which has to withstand a considerable pressure difference, which will bring about considerable overlapping of the electrical field.

The detector according to the invention eliminates these disadvantages.

SUMMARY OF THE INVENTION

It is an object of the invention to provide an ionization gas detector for the detection of a beam of ionizing radiation comprising a tight enclosure forming an ionization chamber containing a high pressure gas, the enclosure containing at least two measuring electrodes and, in the extension of these measuring electrodes, two guard electrodes, the measuring electrodes being respectively raised to a first potential and a second potential and the guard electrodes being respectively raised to the potential of the measuring electrodes which they extend, the enclosure being subdivided in tightly sealed manner into at least two compartments by means of a dielectric material partition which is permeable to the ionizing radiation beam. The compartments are arranged in succession along the path of the beam, with the measuring electrodes being arranged in one of the compartments, called the downstream compartment and the guard electrodes in the other compartment, called the upstream compartment.

BRIEF DESCRIPTION OF THE DRAWINGS

The invention is described in greater detail hereinafter relative to non-limitative embodiments and the attached drawings, wherein show:

FIG. 5 a pressure balance system.

FIG. 6 a detector according to the invention for a fan-shaped beam.

DETAILED DESCRIPTION OF THE PREFERRED EMBODIMENTS

Figure 1:
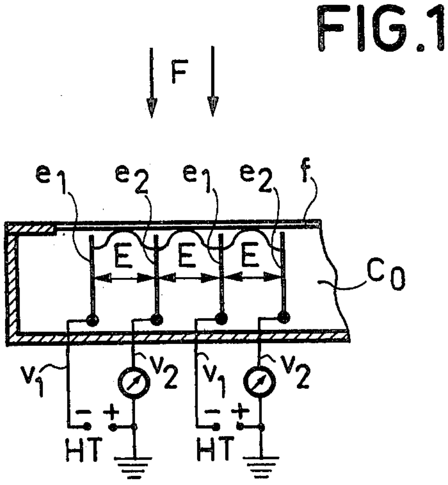
FIG. 1 diagrammatically a known ionization chamber detector.

The known ionization chamber detector of FIG. 1 comprises an enclosure $C_o$ into which a gas with a high atomic number is introduced under high pressure. This enclosure is provided with a window F permeable to the ionizing radiation beam F (X-rays in the present example).

Electrodes $e_1,e_2,e_1,e_2$ . . . respectively raised to the potentials $v_1,v_2,v_1$ . . . are placed in the said enclosure. The lines of force of the electrical field E, perpendicular to the electrodes, deform at the ends thereof and interfere with the measurements performed by the detector.

Figure 2:
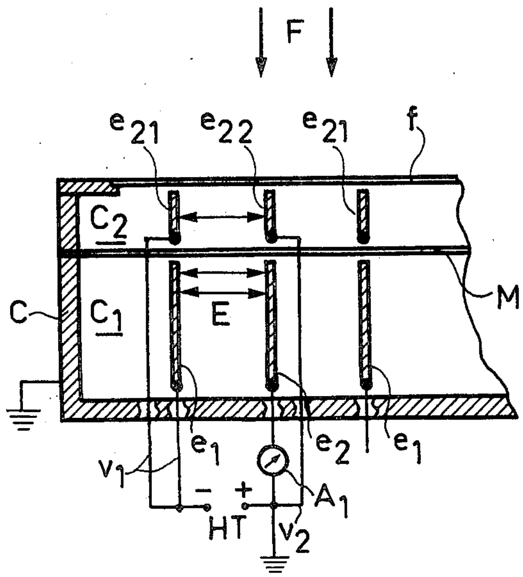
FIG. 2 in longitudinal section an embodiment of a detector according to the invention.

The detector according to the invention, shown in FIG. 2, obviates these disadvantages. This detector comprises a tight enclosure C having a window f. Enclosure C is subdivided into two compartments $C_1$ and $C_2$ by means of a partition M made from an electrically insulating material and which is permeable to the ionizing radiation beam (X-rays) and which is located substantially perpendicular to the X-ray beam F.

Figure 3:
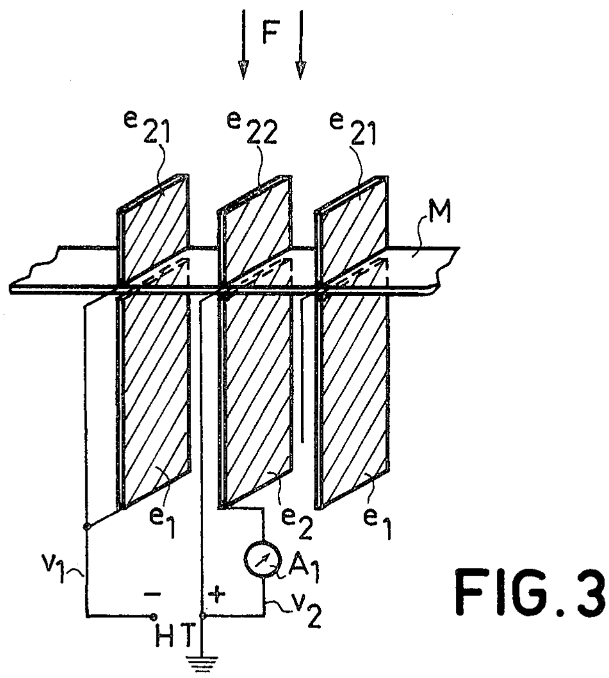
FIG. 3 a detail of the detector of FIG. 2.

Metal plates forming measuring electrodes $e_1$, $e_2$,$e_1$ . . . are successively arranged within compartment $C_1$ (downstream compartment) so as to face one another. Two successive electrodes are separated from one another by predetermined distances. Compartment $C_2$ (upstream compartment) contains guard electrodes $e_{21}$-,$e_{22}$,$e_{21}$ . . . positioned in the extension of the measuring electrodes $e_1$,$e_2$,$e_1$ . . . FIG. 3 shows a detail of FIG. 2.

Electrodes $e_1$ and $e_{21}$ are raised to the same first potential field $v_1$ and electrodes $e_2$ and $e_{22}$ to a same second potential $v_2$. Potential $v_1$ is, for example, a negative potential of several thousand Volts relative to earth (to which is e.g. connected the enclosure) and potential $v_2$ is then a positive potential, e.g. to earth, or equal to a few dozen Volts, for example, relative to earth.

A high pressure gas with a low atomic number (e.g. hydrogen or helium) is introduced into the upstream compartment $C_2$, whilst a gas with a high atomic number (e.g. xenon) is introduced, substantially at the same pressure, into the downstream compartment $C_1$.

In operation, the X-ray beam F passes through window f and successively enters upstream compartment $C_2$ having for the X-ray beam a very low attenuation gas partition, then into downstream compartment $C_1$ where the lines of force of the electrical field E remain perpendicular to electrodes $e_1, e_2$ . . . without undergoing deformations, the guard electrodes $e_{21}, e_{22}$ . . . being very close to the corresponding main electrodes $e_1, e_2$ . . . , because they are separated by a very thin partition M (e.g. 1/10 mm). Moreover, the guard electrodes form an antidiffusion screen. A measuring apparatus $A_1$ is, for example, placed in the electrical circuit of electrode $e_2$, supplying a signal $I_2$ corresponding to the current collected by said electrode $e_2$.

It should be noted that the detector according to the invention makes it possible to carry out measurements for different energy levels of the X-ray beam.

Thus, as the attenuation varies exponentially with distance, such measurements can be carried out by an upstream compartment $C_2$ into which has been introduced a high pressure gas with a moderate atomic number (e.g. krypton or argon-krypton). The deformations of the lines of force of the electrical field E level with window f will then be negligible.

Figure 4:
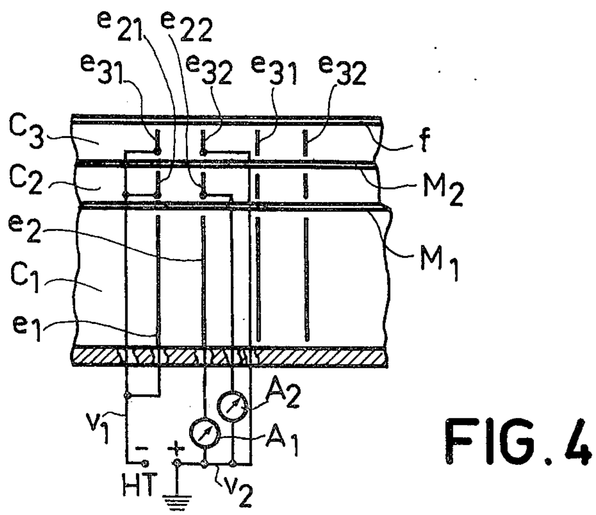
FIG. 4 another embodiment of a detector according to the invention.

The invention is in no way limited to the embodiment of the detector described hereinbefore. In particular, the detector according to the invention can have more than two successive compartments, i.e. one downstream compartment $C_1$ and several upstream compartments $C_2, C_3$ . . . (FIG. 4) separated from one another by thin partitions $M_1, M_2$. These compartments $C_2, C_3$ respectively contain the electrodes $e_{21}, e_{22}$ and $e_{31}, e_{32}$. Electrodes $e_{21}$ and $e_{31}$ are at the same potential as the electrode $e_1$ which they extend and electrodes $e_{22}, e_{32}$ are at the same potential as electrode $e_2$ which they extend. Electrodes $e_{21}, e_{22}$, $e_{31}, e_{32}$ are such that the low X-ray absorption occurs in the median zone of the interelectrode space. The gases introduced into the different compartments $C_1, C_2, C_3$ are at the same time pressured and have different atomic numbers, the gas with the highest atomic number being introduced into compartment $C_1$. For example, a measuring apparatus is placed in the circuit of electrode $e_2$. Measuring apparatus $A_2$, $A_3$ can also be placed in the circuits of electrodes $e_{22}$ and $e_{32}$.

A pressure balance system, like that e.g. in FIG. 5, can be associated with the compartments $C_1$, $C_2$ to ensure that the gases introduced into these compartments $C_1$, $C_2$ remain at the same pressure.

This system comprises a twice-bent tube T, whose ends 1 and 2 open respectively into compartments $C_1$ and $C_2$. A transverse wall 3 can be moved on either side of a median position and balances the pressures of the gases contained in compartments $C_1$ and $C_2$. Wall 3 can be a deformable membrane fixed to tube T or a piston.

Such detectors can advantageously be used in translation-rotation-type tomo-scanners or in pure rotation-type tomo-scanners (FIG. 6).

WHAT IS CLAIMED IS:

1. An ionization gas detector for detecting a beam of ionizing radiation, comprising a tight enclosure forming an ionization chamber containing a gas, said enclosure containing at least two measuring electrodes and, in the extension of the measuring electrodes, two guard electrodes, the measuring electrodes being respectively raised to a first potential and to a second potential and the guard electrodes being respectively raised to the potential of the measuring electrodes which they extend, the enclosure being subdivided in tightly sealed manner into at least one upstream compartment and one downstream compartment by means of a dielectric material partition permeable to the ionizing radiation beam and substantially perpendicular to said beam, said compartments being arranged in succession along the path of the beam, the measuring electrodes being arranged in the downstream compartment and the guard electrodes in the upstream compartment.

2. An ionization gas detector according to claim 1, wherein the gases introduced into the upstream and downstream compartments are substantially at the same pressure.

3. An ionization gas detector according to claim 2, wherein the gases introduced into the upstream and downstream compartments have different atomic numbers, the gas introduced into the upstream compartment having the lowest atomic number.

4. An ionization gas detector according to claim 1, wherein the enclosure is subdivided in tightly sealed manner into n compartments ($C_1$, $C_2$, $C_3$), n being an integer above 2, said compartments ($C_1$, $C_2$, $C_3$ . . . ) respectively containing pairs of electrodes ($e_1, e_2$; $e_{21}, e_{22}$; $e_{31}, e_{32}$), the electrodes ($e_{21}$ and $e_{31}$) being located in the extension of electrode ($e_1$) and are raised to the same potential as electrode ($e_1$), electrodes ($e_{22}, e_{32}$) being located in the extension of electrode ($e_2$) and raised to the same potential as electrode ($e_2$) and wherein the gases introduced into the compartments ($C_1, C_2, C_3$) re at the same pressure.

5. An ionization gas detector according to claim 4, wherein the gases introduced respectively into compartments $C_2$, $C_3$ have atomic numbers which are lower than that of the gas introduced into compartment $C_1$.

6. An ionization detector according to claim 2, wherein a system for balancing the pressures of the gases contained in the different compartments of the tight enclosure is connected between said compartments.

7. An ionization detector according to claim 4, wherein a system for balancing the pressures of the gases contained in the different compartments of the tight enclosure is connected between said compartments.

8. An ionization gas detector according to claim 6, wherein the balance system comprises at least one twice-bent tube, whose ends open respectively into the two compartments, within which the pressures of the gases are to be balanced, and wherein a tightly sealed, movable wall transversely divides the tube into two parts.

9. An ionization gas detector according to claim 7, wherein the balance system comprises at least one twice-bent tube, whose ends open respectively into the two compartments, within which the pressures of the gases are to be balanced, and wherein a tightly sealed, movable wall transversely divides the tube into two parts.

10. An ionization gas detector according to claims 8 or 9, wherein the movable partition is a deformable, flexible membrane.

11. An ionization gas detector according to claims 8 or 9, wherein the movable partition is a piston.

* * * * *